United States Patent
Salgado et al.

(10) Patent No.: US 6,477,443 B2
(45) Date of Patent: *Nov. 5, 2002

(54) METHOD AND APPARATUS FOR CHARGING FOR PRINTING MIXED SHEET SIZES ON AN ELECTROPHOTOGRAPHIC PRINTING MACHINE

(75) Inventors: David L. Salgado, Victor, NY (US); John W. Daughton, Rochester, NY (US); Jeffrey Gramowski, Webster, NY (US); Thomas G. Lindsay, Penfield, NY (US); Michael W. Barrett, Fairport, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/538,392

(22) Filed: Mar. 29, 2000

(65) Prior Publication Data

US 2002/0035411 A1 Mar. 21, 2002

(51) Int. Cl.[7] .................................................. G06F 7/00
(52) U.S. Cl. ........................ 700/220; 700/213; 705/400
(58) Field of Search ................................ 700/213, 220; 705/400

(56) References Cited

U.S. PATENT DOCUMENTS

| | | | |
|---|---|---|---|
| 4,133,420 A | | 1/1979 | McManus .................. 194/9 T |
| 4,510,768 A | * | 4/1985 | Keller ........................ 241/286 |
| 4,519,088 A | | 5/1985 | Rademacher ................. 377/16 |
| 4,641,272 A | * | 2/1987 | Sasaki et al. ................ 364/559 |
| 4,972,655 A | * | 11/1990 | Ogawa |
| 5,016,059 A | * | 5/1991 | Smeiman ...................... 399/80 |
| 5,172,398 A | | 12/1992 | Simons ........................ 377/13 |
| 5,175,691 A | * | 12/1992 | Baker et al. ........... 364/478.08 |
| 5,377,098 A | * | 12/1994 | Sakai ........................... 705/29 |
| 5,383,129 A | * | 1/1995 | Farrell ......................... 377/13 |
| 5,444,779 A | * | 8/1995 | Daniele ......................... 380/3 |
| 5,506,661 A | * | 4/1996 | Hanzawa ...................... 377/14 |
| 5,606,507 A | * | 2/1997 | Kara ........................... 705/408 |
| 5,673,190 A | * | 9/1997 | Kahleck et al. ............. 364/131 |
| 5,673,193 A | * | 9/1997 | Brust et al. ................. 705/406 |
| 5,799,281 A | * | 8/1998 | Login et al. .................... 705/1 |
| 5,819,666 A | * | 10/1998 | Ishikawa et al. |
| 5,826,869 A | * | 10/1998 | Nyffenegger et al. ..... 270/52.02 |
| 5,909,227 A | * | 6/1999 | Silverbrook .................... 347/3 |
| 5,974,233 A | * | 10/1999 | Nishiyama et al. ......... 358/1.13 |
| 5,983,209 A | * | 11/1999 | Kara ........................... 705/407 |
| 6,088,550 A | * | 7/2000 | Asai et al. ..................... 399/79 |
| 6,131,053 A | * | 10/2000 | Nyffenegger et al. ....... 700/220 |
| 6,216,113 B1 | * | 4/2001 | Aikens et al. ................. 399/79 |
| 6,246,993 B1 | * | 6/2001 | Dreyer et al. ............... 700/100 |
| 6,272,248 B1 | * | 8/2001 | Saitoh et al. ................ 382/218 |
| 6,304,335 B1 | * | 10/2001 | Furuya et al. .............. 358/1.15 |
| 6,330,542 B1 | * | 12/2001 | Sevcik et al. ............... 705/400 |

FOREIGN PATENT DOCUMENTS

WO 92/17861 * 10/1992 .................. 705/401

* cited by examiner

Primary Examiner—Donald P. Walsh
Assistant Examiner—Jeffrey A. Shapiro
(74) Attorney, Agent, or Firm—Linda M. Robb

(57) ABSTRACT

A method for enabling a printing machine having a customer billing interface to bill the customer for marking jobs having different sheet sizes includes programming different rates for different size sheets into the printing machine. With receipt of a machine enable signal from the customer billing interface, a sheet is fed and the printing machine determines the sheet size. After the printing machine performs a marking operation, the printing machine emits a signal for each sheet marked to the customer billing interface.

4 Claims, 4 Drawing Sheets

METHOD AND APPARATUS FOR CHARGING FOR PRINTING MIXED SHEET SIZES ON AN ELECTROPHOTOGRAPHIC PRINTING MACHINE

FIELD OF THE INVENTION

This invention relates to electrophotographic printing machine billing systems, and more particularly relates to a programmable billing system for self-service electrophotographic printing machines.

BACKGROUND OF THE INVENTION

Many establishments now provide self-service copy machines, printers, or multi-functional devices, which are operated either on a coin or card basis. Commonly, the coin or card interface physically attaches to the machine via an interface port. The combination of the port and the interface device provides a means of controlling machine operation and a means for counting copies generated. The interface device (e.g. coin-operated machine or debit card reader) controls the processing of copy or print jobs by enabling or disabling a "machine enable" signal. When this signal is enabled, the system allows the marking of jobs.

When a sheet is marked (copied or printed), the system emits a "sheet fed" pulse to the interface device. When no credits remain, the interface device turns off the "machine enable" signal. Upon the disabling of this signal, the system stops the marking of the job. When more credits are provided, the foreign interface device turns on the "machine enable" signal that causes the system to resume the marking of the job.

However, as copiers, printers, and multi-functional machines have evolved, their functionality and available features have increased. These machines provide both simplex and duplex copies, various types of finishing (e.g. stitching, binding, hole-punching, etc.), and variable sheet size capabilities. Unfortunately, the standard interface is not configured with varying charge rates for jobs containing sheets of mixed sizes. Existing systems usually bill for an entire job at the billing rate for the largest sheet in the job. To avoid excess charges, customers generally separate large size sheets and process them through the printing machine as a separate job, which is both time consuming and inconvenient for the customer. A method is needed that provides variable billing based on sheet size for mixed sheet size jobs to avoid incorrect billing and inconvenience to the customer.

The following disclosures may be relevant to various aspects of the present invention and may be briefly summarized as follows:

U.S. Pat. No. 4,133,420 to McManus discloses a coin actuated device for operating a copy machine. The device couples to a conventional electrostatic or bond copy machine and provides both coin actuated or bypass operation. The circuitry of the control device includes a power control relay which provides power to a receptacle plug connected to the copy machine, a variable time delay circuit to allow warm-up time between coin actuation and print actuation, and a variable print process timing circuit to allow for process print time prior to shut down of the device.

U.S. Pat. No. 4,519,088 to Rademacher, et al. discloses a usage control system for copiers. The control system connects to the copier through an existing accounting system connection. The copier initiates operation when it receives a signal from a check-operated device, such as a coin box or magnetic card reader. The copier supplies a signal to increment the counter in the accounting system when the operation has progressed. After a delay to permit completion of the copy cycle, the operate signal is reset, and the copier is disabled.

U.S. Pat. No. 5,016,059 to Smeiman discloses a remote control system for providing accurate copy count and control in the operation of self-service photocopy machines. The system includes a remotely located transmitter, which sends digital signals to enable or disable a self-serve photocopy machine. A receiver mounted on the photocopy machine controls a digital display indicating the number of photocopies being made. A user-operated switch on the receiver lets a user disable the copy machine when copying is complete. The photocopy machine is then enabled by a reset signal sent from the remote transmitter, which also clears the digital display.

U.S. Pat. No. 5,172,398 to Simons discloses a device for recording charges for copies made on a copy machine by way of two or more accounting means connected by the device to the copy machine via a plurality of connection points. Each connection point is connected separately to a different accounting means and control means, which selectively activates one of the accounting means for recording charges.

SUMMARY OF THE INVENTION

Briefly stated, and in accordance with one aspect of the present invention, there is provided a method of billing a customer for mixed size output sheets printed by a printing machine. The method includes programming a printing machine with billing rates for different sheet sizes, receiving an enable signal from a customer interface, feeding a sheet to the copier, determining sheet size, and sending a billing signal for each sheet marked to the customer interface.

BRIEF DESCRIPTION OF THE DRAWINGS

The foregoing and other features of the instant invention will be apparent and easily understood from a further reading of the specification, claims, and by reference to the accompanying drawings in which:

All references cited in this specification, and their references, are incorporated by reference herein where appropriate for teaching additional or alternative details, features, and/or technical background.

While the present invention will hereinafter be described in connection with a preferred embodiment, it will be understood that this description is not intended to limit the invention to that embodiment or method of use. On the contrary, the following description is intended to cover all alternatives, modifications, and equivalents, as may be included within the spirit and scope of the invention as defined by the appended claims.

DETAILED DESCRIPTION OF THE INVENTION

Figure 1:
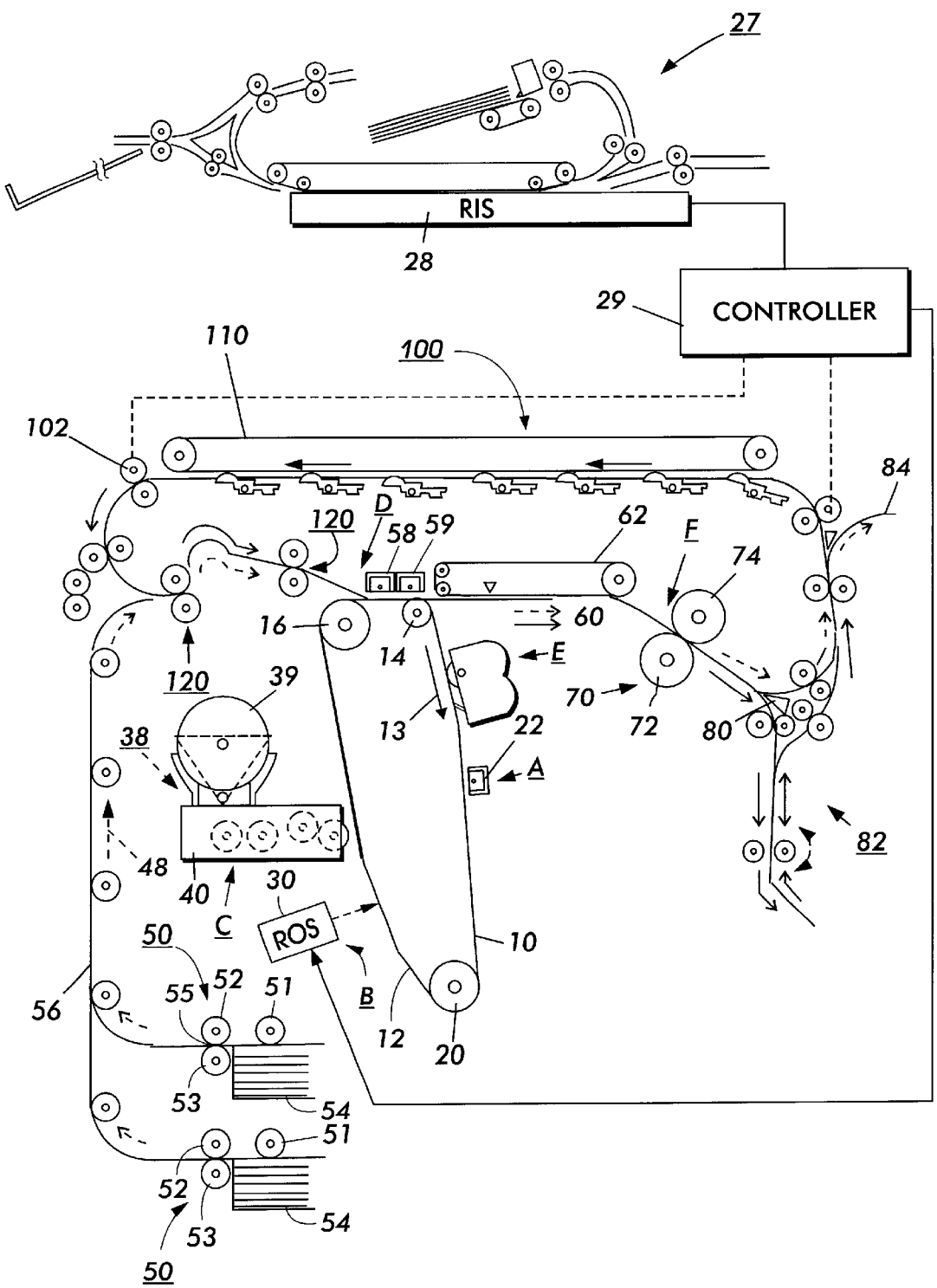
FIG. 1 is a schematic elevational view of a typical electrophotographic printing machine utilizing the billing system of the present invention.

For a general understanding of an electrophotographic printer or copier, in which the present invention may be incorporated, reference is made to FIG. 1, which depicts schematically the various components thereof. Hereinafter, like reference numerals have been used throughout to identify identical elements. Although the customer billing system of the present invention is particularly well adapted for use in an electrophotographic printing machine, it should become evident from the following discussion that it is equally well suited for use in other applications and is not necessarily limited to the particular embodiment shown herein.

Referring now to the drawings, the various processing stations employed in the reproduction machine illustrated in FIG. 1 will be described briefly hereinafter. It will no doubt be appreciated that the various processing elements also find advantageous use in electrophotographic printing applications from an electronically stored original, and with appropriate modifications, to an ion projection device which deposits ions and image configuration on a charge retentive surface.

On a reproduction machine, in which the present invention finds advantageous use, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

The electrophotographic printing machine generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 20 and drive roller 16. As roller 16 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station B, a controller or electronic subsystem (ESS), indicated generally by reference numeral 29, receives the image signals representing the desired output image and processes these signals to convert them to a continuous tone or grayscale rendition of the image. This image is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 39, dispenses toner particles into developer housing 40 of developer unit 38.

With continued reference to FIG. 1, after the electrostatic latent image is developed, the toner powder image present on belt 10 advances to transfer station D. A print sheet 48 is advanced to the transfer station D by a sheet feeding apparatus 50. Preferably, sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62, which advances sheet 48 to fusing station F.

Fusing station F includes a fuser assembly indicated generally by the reference numeral 70, which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 16 to a finisher or stacker, or deflects the sheet into the duplex path 100, specifically, first into single sheet inverter 82. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100. The sheet is then inverted and fed to acceleration nip 102 and belt transports 110, for recirculation back through transfer station D and fuser 70 for receiving and permanently fixing the side two image to the backside of that duplex sheet before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the non-transferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

Controller 29 regulates the various machine functions. The controller is preferably a programmable microprocessor, which controls all of the machine functions described herein. The controller provides a comparison count of the copy sheet, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 2:
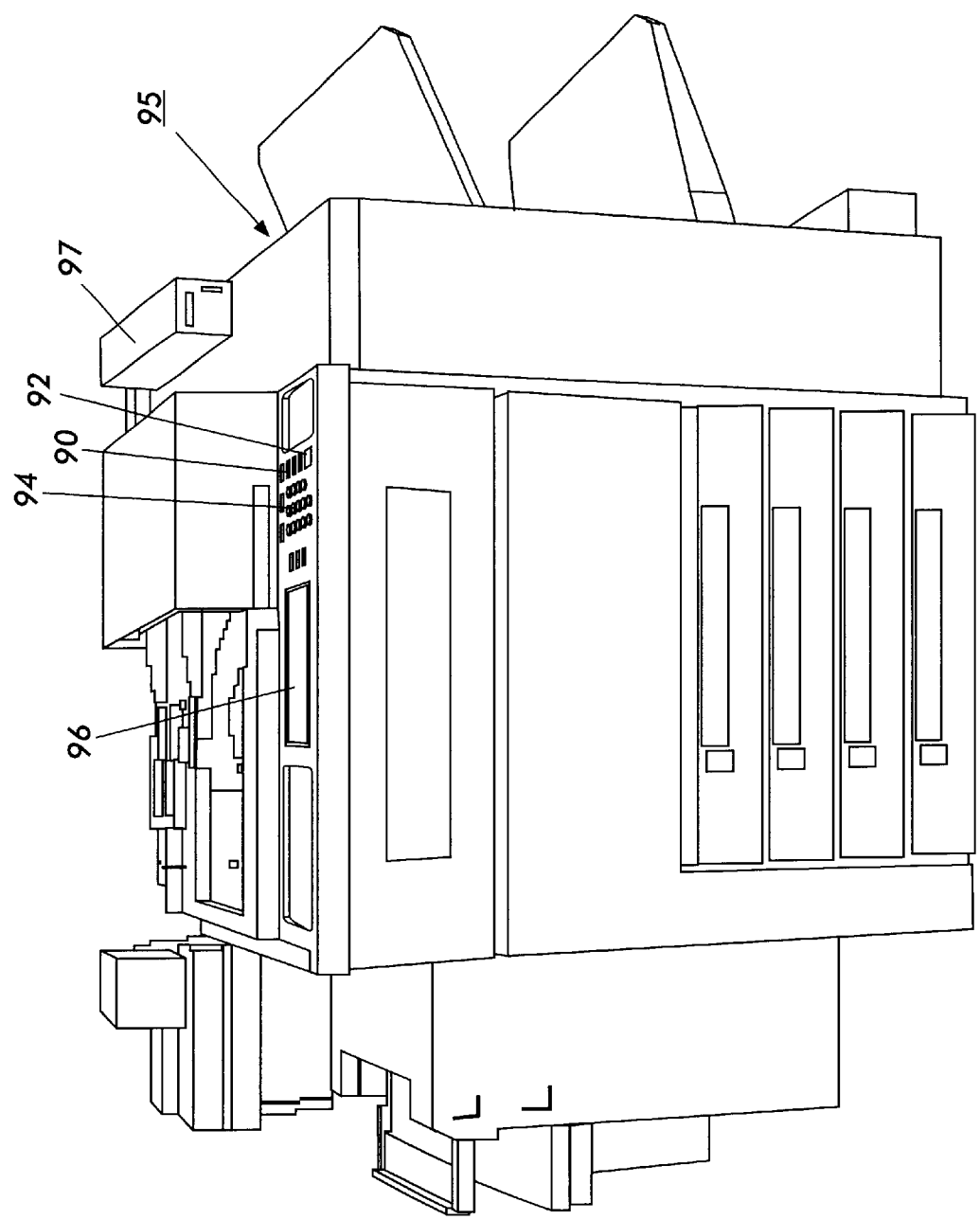
FIG. 2 is a perspective view of a typical electrophotographic printing machine utilizing the billing system of the present invention.

Referring now to FIG. 2, there is shown an exemplary printing system for processing, printing, and finishing print jobs in accordance with the teachings of the present invention. For purposes of explanation, the operator interface portion of the printing system includes a touch display panel 96, a keypad 94, a print button 92, control buttons 90, and an on/off switch 98. An external finishing device 95 is shown coupled to the printing- system for receiving print sets therefrom and performing finishing operations such as stitching (stapling) sheets together, thermally binding sheets together to form books or pamphlets, hole-punching, etc. Various types of external devices are available from numerous suppliers for providing specified paper finishing capabilities. Also coupled to the printing system is an external interface device 97, such as a coin box or card reader, which provides a means of controlling machine operation and for charging for copies made through the generation of machine enable signals and the receipt of output signals from the system controller, to be discussed in more detail below.

As described above, all copier and document handler and sorter operations are preferably controlled by a generally conventional programmable controller 29. The controller 29 is additionally programmed with certain novel functions and graphic user interface features described herein for the operation of the electrophotographic printing system and the selectively variable set delivery output functions of the present invention. The controller 29 also conventionally provides for storage and comparison of the counts of the copy and document sheets, the number of documents fed and recirculated in a document set, the desired number of copy sets, and other functions which may be input into the machine. These functions may be input by the operator through a connecting panel of numerical and other controls, or through a variety of customized graphic user interface screens. Controller information and sheet path sensors are utilized to control and keep track of the positions of the respective document and copy sheets making up a print set and the operative components of the apparatus by their connection to the controller. As shown herein, the machine controller 29 preferably includes a known touch-screen type of integrated operator input control and display which also conventionally operates and changes displays on a user interface display panel 96, which preferably includes operator selection buttons or switches.

Figure 3:
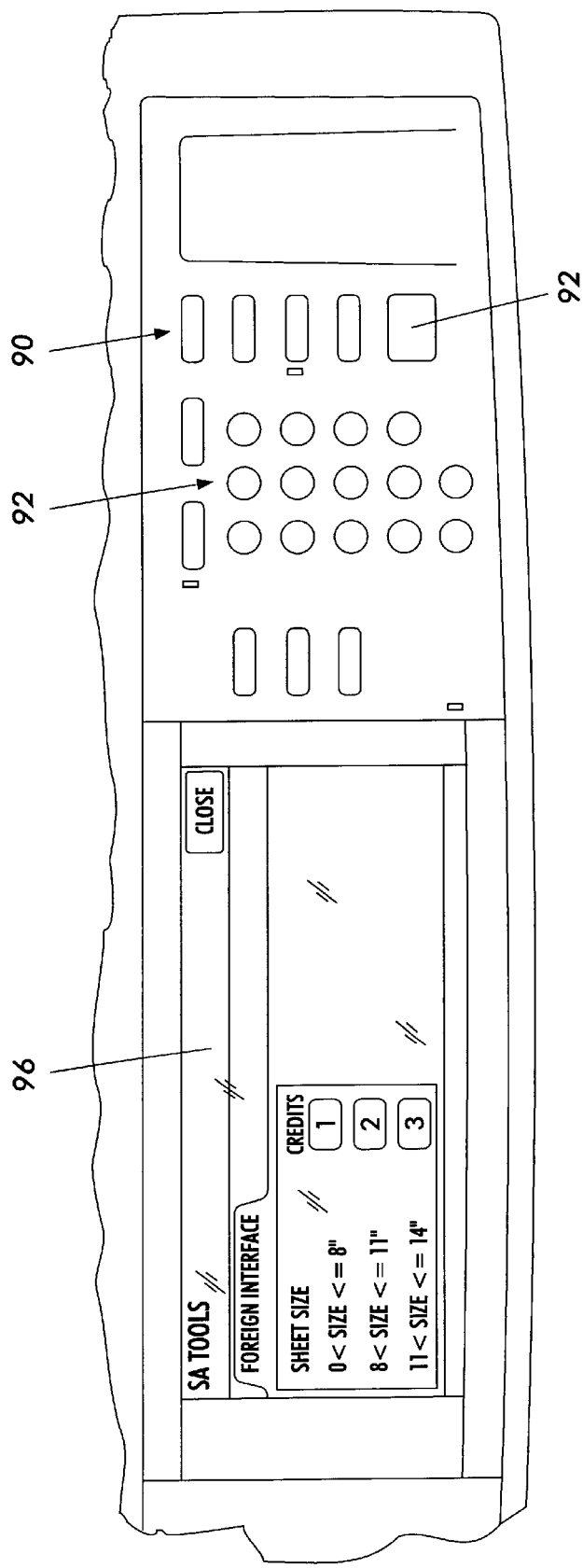
FIG. 3 is a view of a prompt screen for the control subsystem of the electrophotographic printing machine of FIG. 1.

Referring now to FIG. 3, shown is the operator interface section of the printing system. Touch panel 96 displays the system operator screen for the specification of billing rates for specific sample billing operations. Of course, the sheet size options specified will vary with the capabilities of the printing machine. For each sheet size specified, the system operator may touch the screen corresponding to that size. The system operator is then prompted to key in from keypad 94 the number of units to be billed for marking that sheet size. For example, a customer may be billed one credit for marking a sheet eight inches or less in size, tow credits for marking a sheet between eight and eleven inches in size, and three credits for a sheet size from 11 to 14 inches. A credit is equivalent to the number of electronic pulses sent to the external interface device 97 by controller 29. In the case of the copying of a single 8-inch sheet, one electronic pulse, or one credit, is sent to the external interface device 97. In this manner, the system operator selectively sets the billing rate for each type of finishing operation requested by a customer. These billing rates may be reset by the system operator as the need arises to adjust billing rates.

Figure 4:
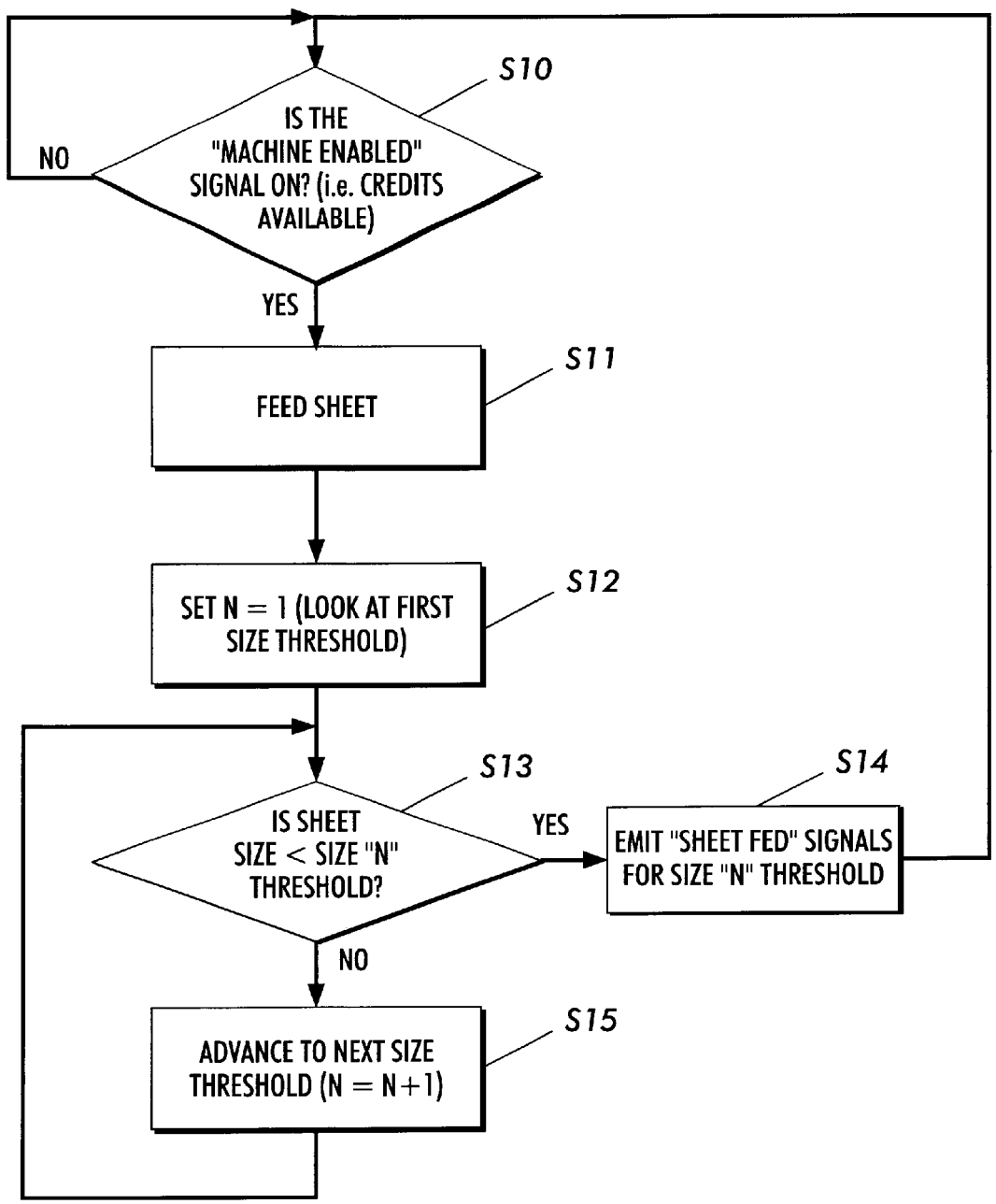
FIG. 4 is a flow chart showing successive billing operation steps according to the billing system of the present invention.

Referring now to FIG. 4, the flowchart describes how a printing system having an external interface device 97 charges for variable sheet sizes as a job is marked. For purposes of this disclosure, a job means, generally, any media that is or has been processed through a marking operation. First, at step S10 a machine enable signal is received from the foreign interface device. This enable signal may be generated from a coin box in response to the deposit of a coin or a plurality of coins. Another possible source of the machine enable signal is an encoded card system. Such a system uses cards encoded with a value representing a given amount of usage of the machine, either in dollars or number of copies. When the card is inserted into a reader slot, the usage remaining is compared with that required, and the machine enable signal is generated if enough usage remains to pay for a copy. Other devices, such as bill changers, token boxes, etc., may be used within the teachings of the present invention. If a machine enable signal is not received by the controller at step S10, the printing machine is not activated.

After a machine enable signal is received by the controller of the copier, a copy sheet is fed to the copier at step S11. The machine controller then compares the fed sheet size to a first size threshold (step S12). In those cases in which the fed sheet size exceeds the first threshold value, the controller checks the next threshold value at step S13. If the fed sheet is not less than the second threshold value, the controller then advances to the next size threshold and compares the fed sheet size to the new threshold value at step S15. This process of advancing to a new size threshold and comparing the sheet fed size to the new threshold continues until a threshold level is identified that exceeds the fed sheet size. When the correct size threshold is identified, the sheet is marked and the controller sends "sheet fed" pulses corresponding to the billing level for that sheet size to the foreign attachment device at step S14.

The marking operation for a set of sheets may be interrupted at any point if the foreign attachment device turns off the "machine enable" signal. This interruption in print or copy operation may occur when insufficient credits have been provided to the foreign attachment to support completion of the job. When the customer supplies additional credits, the interface device turns on the "machine enable" signal and marking operation resumes. Upon completion of a sheet or stack, the controller recognizes the job as being complete. Printing operation then ceases and the controller again checks for the presence of a "machine enable" signal for the start of a new job.

It is therefore apparent that there has been provided in accordance with the present invention, a programmable billing system that allows a foreign interface device to do specialty charges on a per sheet basis instead of a job basis for printing operations in self-service electrophotographic printing machines that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed:

1. A method of enabling a self-service printing machine having an external customer interface device to bill for printing jobs having mixed size sheets, comprising the steps of:

programming different billing rates in the printing machine for different size sheets through use of a user interface;

receiving a signal from the external customer interface device indicating customer credits therein, wherein said external customer interface device is independent of said user interface;

controlling the printing of sheets fed to the printing machine, comprising:

feeding a sheet to the printing machine;

determining the size of said sheet;

sending a signal to the external customer interface device corresponding to the billing rate amount programmed for said sheet size;

deducting said billing rate amount from said customer credits contained within the external customer interface device;

determining whether customer credits remain in the external customer interface device after deducting said billing rate amount from said customer credits;

disabling the printing machine in response to the external customer interface device indicating that no customer credits remain within the external customer interface device; and sending an enable signal from the external customer interface device to the printing machine if credits remain within the external customer interface device; and repeating said controlling step until printing is terminated.

2. The method according to claim 1, further including printing information on the sheet.

3. The method according to claim 1, wherein the step of determining sheet size comprises comparing the size of the sheet fed to sheet size thresholds.

4. The method according to claim 3, wherein the step of comparing comprises:

comparing the size of the sheet fed to an initial sheet size threshold;

determining whether the size of the sheet fed is less than the initial threshold; and comparing the size of the sheet fed to at least one additional sheet size threshold until the size of the sheet fed is determined.

* * * * *